(12) United States Patent
Möller et al.

(10) Patent No.: US 7,395,809 B2
(45) Date of Patent: Jul. 8, 2008

(54) INTERNAL COMBUSTION ENGINE AND A METHOD FOR SUCH AN ENGINE

(75) Inventors: Kjell Möller, Skärhamn (SE); Daniel Gustavsson, Torslanda (SE); Martin Andreasson, Torslanda (SE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/675,898

(22) Filed: Feb. 16, 2007

(65) Prior Publication Data

US 2007/0202990 A1 Aug. 30, 2007

(30) Foreign Application Priority Data

Feb. 24, 2006 (EP) .................................. 06110398

(51) Int. Cl.
*F02D 31/00* (2006.01)
*F02D 33/00* (2006.01)
(52) U.S. Cl. ....................... 123/376; 123/325
(58) Field of Classification Search ................. 123/430, 123/295, 305, 320, 325, 376, 399, 189 DB, 123/481

See application file for complete search history.

(56) References Cited

U.S. PATENT DOCUMENTS

| | | | | |
|---|---|---|---|---|
| 4,237,830 A | * | 12/1980 | Stivender | 123/493 |
| 6,161,641 A | * | 12/2000 | Fukumura et al. | 180/197 |
| 6,304,815 B1 | * | 10/2001 | Moraal et al. | 701/115 |
| 6,389,807 B1 | | 5/2002 | Suzuki et al. | |
| 6,907,860 B2 | * | 6/2005 | Mizobuchi et al. | 123/322 |

FOREIGN PATENT DOCUMENTS

| | | |
|---|---|---|
| DE | 19906892 | 8/2000 |
| DE | 102004024087 | 12/2005 |
| EP | 0501538 | 9/1992 |
| EP | 0859138 | 8/1998 |
| EP | 0950806 | 10/1999 |

* cited by examiner

*Primary Examiner*—Mahmoud Gimie
(74) *Attorney, Agent, or Firm*—Julia Voutyras; Alleman Hall McCoy Russell & Tuttle, LLP

(57) ABSTRACT

A method for controlling a diesel engine in a vehicle is presented. The engine comprises at least one cylinder, a fuel injector for each cylinder for injecting fuel into the respective cylinder, and a throttle valve for controlling the flow of air into the cylinder. The throttle valve is adjusted to assume a not fully open position if an amount of fuel injected into the at least one cylinder is equal to or less than a fuel injection threshold value.

20 Claims, 3 Drawing Sheets

INTERNAL COMBUSTION ENGINE AND A METHOD FOR SUCH AN ENGINE

TECHNICAL FIELD

The present invention relates to an internal combustion engine for a vehicle, and more particularly to a diesel engine comprising at least one cylinder, a fuel injector for each cylinder for injecting fuel into the respective cylinder, and a throttle valve for controlling the flow of air into the cylinder.

BACKGROUND AND SUMMARY OF THE INVENTION

In a normal operational situation of a vehicle engine, the difference between the exhaust gas temperature, and the ambient air temperature can reach 800° C. or more. The temperature difference can cause large thermal stresses in the exhaust manifold, in turn resulting in a risk of cracks appearing in the manifold. A known way to solve this problem is to use high strength materials for the manifold, which, apart from being expensive, often have the disadvantage of being difficult to process when manufacturing the manifold.

Therefore, inventors herein have recognized it is important to make the manufacturing of exhaust manifolds for internal combustion engines less complex and cheaper and to reduce thermal stresses of an exhaust manifold for an internal combustion engine.

Accordingly, a method for controlling a diesel engine in a vehicle, the engine having at least one cylinder, a fuel injector for each cylinder, and a throttle valve for controlling the flow of air into each cylinder, the method includes: controlling the throttle valve to assume a not fully open position if an amount of fuel injected into the engine cylinder is equal to or less than a fuel injection threshold value.

While applicable to any kind of internal combustion engine with fuel injection and a throttle, the invention is especially advantageous in connection to engines with compression combustion such as diesel engines. The inventors have discovered that diesel engines subjected to a lot of overrun (motor brake), i.e., fuel injection shut-down while the crankshaft is turning, compared to engines subjected to less overrun, present higher amount of material failures in the exhaust manifold. The inventors have also recognised that this problem is growing with further developments in engine technology since there is, especially in diesel engines, an increasing use in overrun situations of power extraction from the engine.

By controlling the throttle valve, if the flow of fuel injected into the cylinder is equal to or less than a fuel injection threshold value, so as to assume a not fully open position, the flow of relatively cold air through the engine, and through the exhaust manifold, will decrease. This will decrease the thermal stresses of an exhaust manifold of the engine when heated. In turn, this will reduce the need to make the manifolds in expensive high-temperature enduring materials.

The not fully open position of the throttle valve can be a position in which the throttle valve is less than fifty percent open, preferably less than twenty percent open. If during a motor brake condition of the engine the throttle valve is less than fifty percent open, the flow of cold air to the exhaust manifold is effectively reduced. The throttle valve being less than twenty percent open further reduces the flow of cold air to the exhaust manifold, while maintaining a sufficiently high pressure in the inlet manifold of most typical vehicle engines.

The fuel injection threshold value can be a predetermined value and is preferably chosen so that at or below it, no or a negligible torque contribution from the fuel injection is given. Thereby, it can be determined that gas passing through the cylinders of the engine will not be heated, and that the exhaust manifold could be exposed to cold gas. It should be noted that the threshold value could correspond to no fuel injection at all taking place.

Preferably, the step of controlling the throttle valve is at least partly based on the engine speed. This provides a possibility to obtain at each given engine speed a good trade-off between the desire to reduce the flow of cold air to the exhaust manifold, and to maintain a sufficiently high pressure in the inlet manifold.

Preferably, the step of controlling the throttle valve is at least partly based on a position of an exhaust gas recirculation valve of the engine.

Preferably, it is determined whether a clutch for a gearbox of the vehicle is engaged, the step of controlling the throttle valve being dependent on the clutch being engaged. In a vehicle with a manual gearbox, determining whether the clutch is engaged contributes to establishing whether the engine is subjected to a motor brake situation.

It should be noted that the invention is also applicable to engines in vehicles with automatic transmission. For example, if fuel injected is equal to or less than the fuel injection threshold value, the throttle valve can be controlled as described above when the automatic transmission is in the highest gear with a so called lockup function engaged, or when the automatic transmission is in a manual mode.

Preferably, it is determined whether the engine speed is above a predetermined engine speed value, the step of controlling the throttle valve being dependent on the engine speed being above the predetermined engine speed value.

Preferably, the temperature of an exhaust manifold of the engine is determined, and the step of controlling the throttle valve is based on the exhaust manifold temperature. In a preferred embodiment, it is determined whether the temperature of the exhaust manifold is above a predetermined manifold temperature value, and the step of controlling the throttle valve is dependent on the exhaust manifold temperature being above the predetermined manifold temperature value. Thereby, unnecessary throttling, for example, immediately after a cold start of the engine when the exhaust manifold is not yet hot, can be avoided.

DESCRIPTION OF THE DRAWINGS

Below, the invention will be described closer with reference to the drawings, in which.

DETAILED DESCRIPTION OF PREFERRED EMBODIMENT(S)

Figure 1:
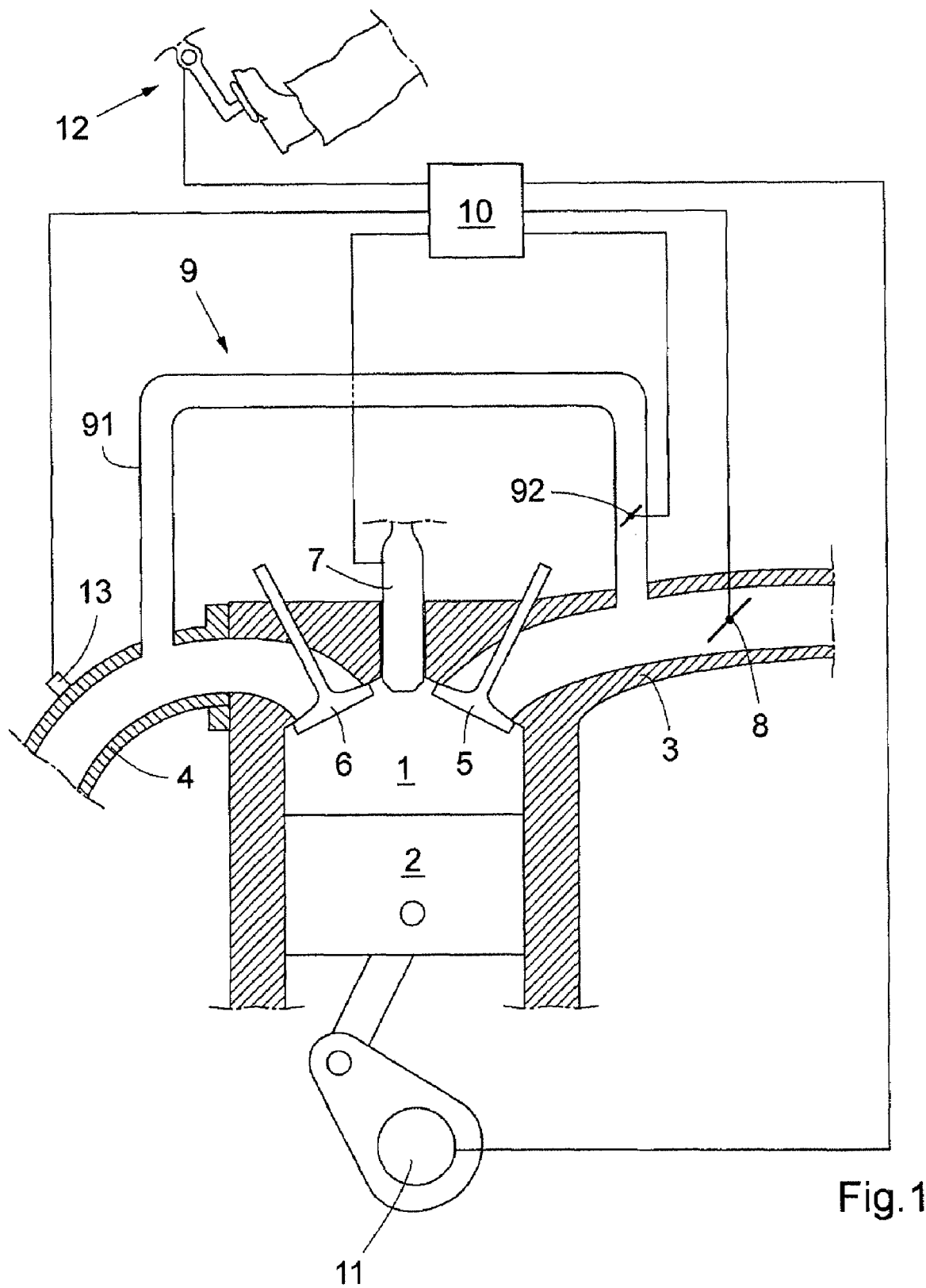
FIG. 1 shows schematically parts of an internal combustion engine with compression ignition.

FIG. 1 shows schematically parts of an internal combustion engine, with compression ignition, for a vehicle. The engine comprises a cylinder 1 with a piston 2. The invention is suitable for engines with any number of cylinders. The engine further comprises an inlet and an exhaust manifold 3, 4, and an inlet and an exhaust valve 5, 6. A fuel injector 7 is arranged to inject fuel into the cylinder 2. More specifically, the fuel injector 7 is adapted to inject fuel periodically, at least once every work cycle of engine. A throttle valve 8 is provided in the inlet manifold 3 for controlling the air flow to the cylinders 2.

Further, in a manner known in the art, an exhaust gas recirculation (EGR) arrangement 9 is provided with a conduit 91 for guiding exhaust gas from the exhaust manifold 4 to the inlet manifold 3, and an exhaust gas recirculation (EGR) valve 92, for controlling the flow of re-circulated exhaust gas. The EGR arrangement 9, in particular the EGR valve 92, can be provided in numerous manners known in the art, and the illustration in FIG. 1 should be seen as a schematic example.

A control unit in the form of an engine control unit (ECU) 10 is provided. The ECU 10 has computational and data storage capabilities, and can be provided as one physical unit, or alternatively as a plurality of logically interconnected units. The ECU 10 is arranged to send control signals so as to control the position of the throttle valve 8, and the position of the EGR valve 92.

In addition, the ECU 10 is adapted to determine, in manners known in the art, the engine speed, for example by means of a toothed wheel on a crankshaft 11 of the engine, and, in the case of the vehicle being provided with a manual gearbox, the position of a clutch pedal 12 manoeuvrable by a driver of the vehicle. Further, the ECU 10 is adapted to determine, by means of a temperature sensor 13, the temperature of the exhaust manifold. The temperature sensor 13 can be located in any suitable place, for example directly on the exhaust manifold. Alternatively, a sensor located at the exhaust system, downstream of the exhaust manifold can be used, for example between the manifold and a catalytic converter, and thereby an algorithm can be used to take into account a temperature difference between the exhaust manifold and the location of the sensor 13.

Further, the ECU 10 is arranged to send control signals so as to control the fuel injector 7, in a manner known in the art. More specifically, the ECU 10 is adapted to control the amount of fuel injected into the cylinder 1 at each work cycle. The ECU 10 can also be adapted to control the pressure under which fuel is injected into the cylinder 1, as well as the amount of injections per work cycle and the timing of each injection within a work cycle (i.e., the timing in relation to the upper dead center of the piston 2).

As described closer below, the ECU 10 is adapted to send at least one signal so as to control, if the flow of fuel injected into the at least one cylinder is equal to or less than a fuel injection threshold value, the throttle valve 8 so as to assume a not fully open position.

Figure 2:
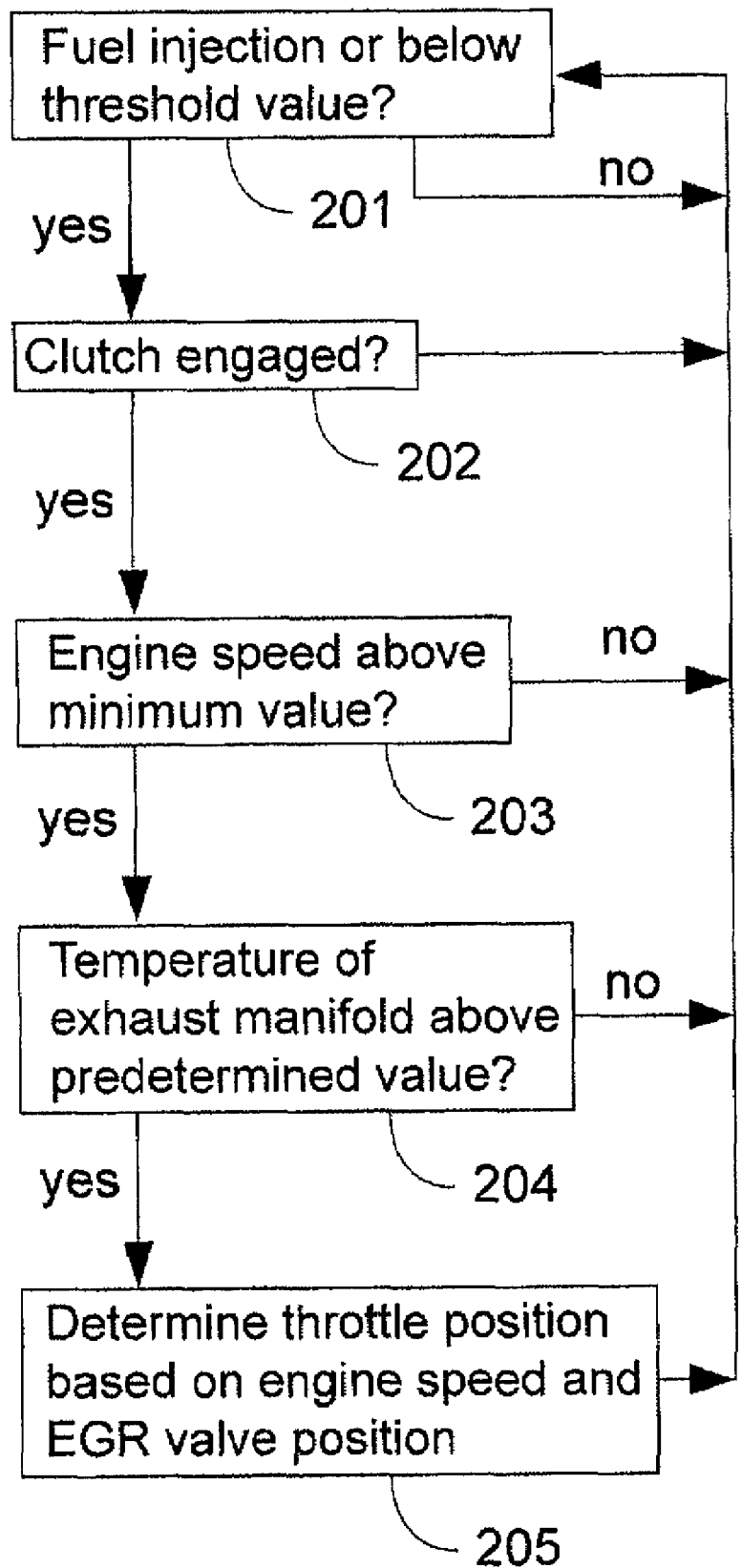
FIG. 2 shows a block diagram depicting steps in a method according to a preferred embodiment of the invention.

FIG. 2 shows a block diagram depicting steps in a method according to a preferred embodiment of the invention. The ECU 10 is adapted to determine 201 whether an amount of fuel injected into the at least one cylinder is equal to or less than the fuel injection threshold value. Preferably, the fuel injection threshold value is preferably chosen so that no combustion takes place at or below it, or so that any combustion gives no or a negligible torque contribution to the engine. By combustion giving a negligible torque contribution, is meant that essentially no torque difference is obtained by changing the efficiency of the combustion. Further, the threshold value can refer to an amount of fuel injected during a certain time interval and it can be defined in a variety of ways. For example, the threshold value can be an amount of fuel injected during a predetermined number of work cycles of the engine. Thus, the threshold value can be an amount of fuel injected at a particular work cycle of the engine, or an amount of fuel injected during more than one work cycle. As a further alternative, the threshold value can relate to an amount of fuel injected during a predetermined time interval. As yet another alternative, the threshold value can relate to an amount of fuel injected during a predetermined time interval during which the fuel injected at each work cycle of the engine is below a predetermined fuel amount value.

Besides an amount of fuel injected into the at least one cylinder being equal to or less than the fuel injection threshold value 201, the step 205 of controlling the throttle valve 8, described closer below, so as to assume a not fully open position, can be dependent on any of a number of further conditions related to the engine operation. Thus, the ECU 10 can be adapted to determine 202 whether the clutch is engaged, i.e., whether the clutch pedal 12 is depressed, whether 203 the engine speed is above a predetermined minimum engine speed value, and whether 204 the temperature of the exhaust manifold 4 is above a predetermined manifold temperature value. Alternative embodiments of the invention can include a variety of combinations of these steps 201-204. Specially, a combination of two of these conditions, namely, the fuel injection flow being at or below the threshold value 201 and the clutch being engaged 202, indicates that the engine is in a motor brake condition.

However, preferably, all the conditions described above, i.e., regarding the fuel injection threshold value 201, the clutch 202, the engine speed 203, and the temperature 204 of the exhaust manifold 4, are required combined for controlling 205 the throttle valve 8, so as to assume a not fully open position.

Figure 3:
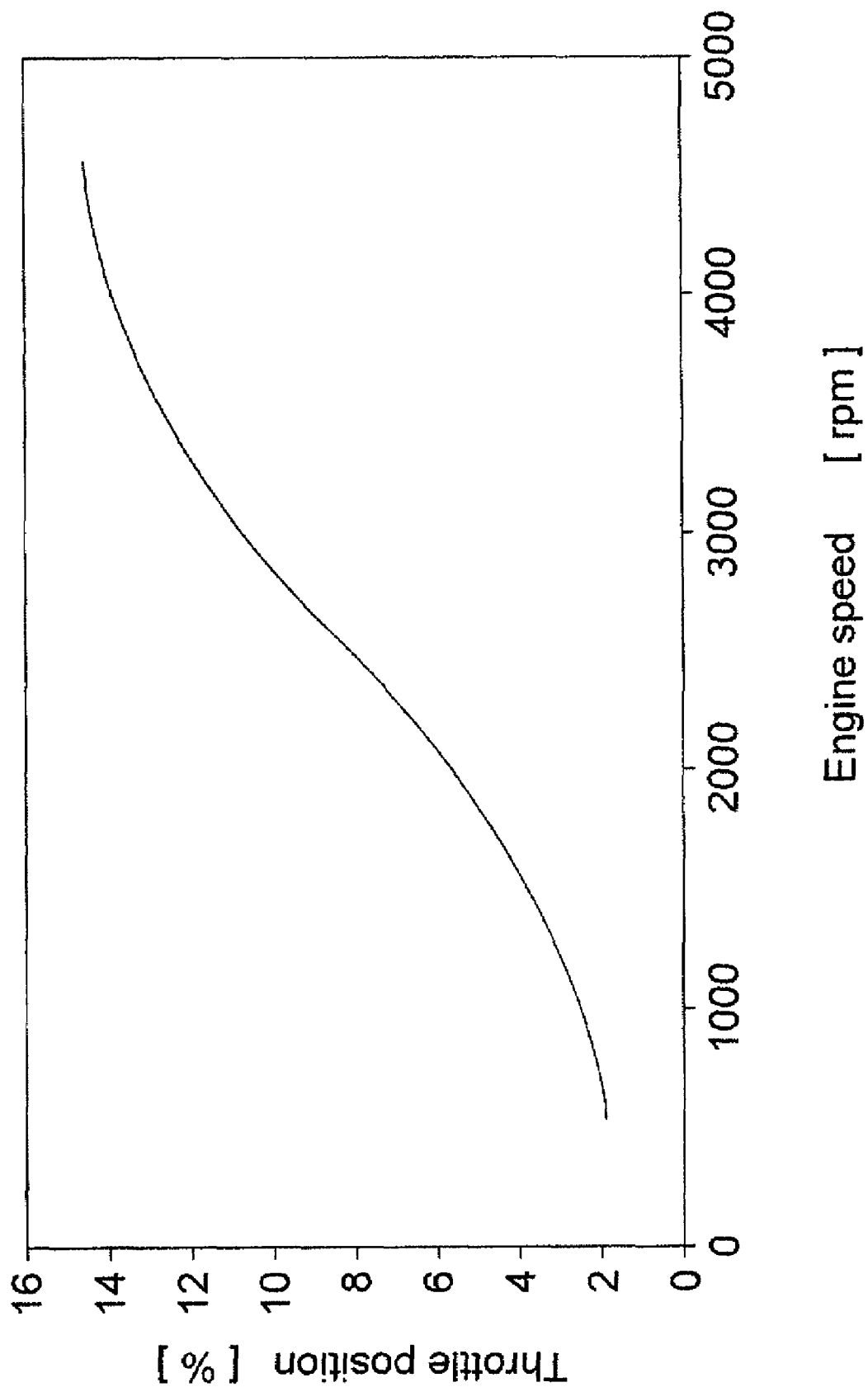
FIG. 3 shows a diagram with an example of a relationship between the engine speed and a throttle position, at a fixed exhaust gas re-circulation valve position.

Reference is made to FIG. 3. Preferably, when controlling 205, the throttle valve 8, so as to assume a not fully open position, the throttle valve position is determined based on the engine speed and the EGR valve 92 position. FIG. 3 shows a diagram with an example of a relationship between the engine speed and the throttle position, at a fixed EGR valve 92 position, for example, twenty percent open. It should be noted that opening the EGR valve 92 will allow closing the throttle valve more than indicated in FIG. 3. In FIG. 3, the throttle valve position is defined in percentage of openness, where 0% is fully closed and 100% is fully open. As can be seen, the throttle valve position during a motor brake condition of the engine is more open at higher engine speeds. The throttle position mapped to the engine speed in this manner to avoid that the pressure in the inlet manifold 3 becomes too low. Thus, the throttle position is chosen so that for each engine speed (and EGR valve position), a good trade-off is accomplished between the requirement for the exhaust manifold 4 not being subjected to too much temperature differences, and the requirement of the pressure in the inlet manifold 3 becoming too low.

Preferably, during operation of the engine the step 201, of determining whether the amount of injected fuel is equal to or less than a fuel injection threshold value, is carried out repeatedly at predetermined time intervals. If the condition(s) 201-204 described above are met, the engine can be said to enter a special throttle control mode, here referred to as a motor brake mode, in which the throttle valve 8 is controlled so as to assume a not fully open position, based at least partly on the fact that the fuel injection is at or below the threshold value. During the motor brake mode, the step 201 is still carried out repeatedly, and if any of the conditions 201-204 are not met, for example, if the engine speed is not above the minimum value 203, the motor brake mode is terminated and the engine can resume a normal way of controlling the throttle.

It should be mentioned that an embodiment where the throttle valve 8 is controlled, if an amount of fuel injected into the at least one cylinder is equal to or less than a fuel injection threshold value so as to assume a fully closed position, is also covered by the scope of the claims.

The invention claimed is:

1. A method for controlling a diesel engine having an exhaust manifold in a vehicle, the engine having at least one cylinder, a fuel injector for each cylinder, and a throttle valve for controlling the flow of air into the engine, the method comprising:

during a motor braking condition, adjusting the throttle valve to assume a not fully open position if an amount of fuel injected into the engine cylinder is equal to or less than a fuel injection threshold value, where the throttle valve is further adjusted to decrease a flow of relatively cold air through the engine, and through the exhaust manifold, if exhaust manifold temperature is above a predetermined temperature threshold.

2. The method according to claim 1, wherein the not fully open position of the throttle valve is a position in which the throttle valve is less than fifty percent open.

3. The method according to claim 1, wherein the not fully open position of the throttle valve is a position in which the throttle valve is less than twenty percent open.

4. The method according to claim 1, the throttle valve position is adjusted based at least partly on the engine speed.

5. The method according to claim 1, wherein the throttle valve position is adjusted based at least partly on a position of an exhaust gas recirculation valve of the engine.

6. The method according to claim 1, wherein the fuel injection threshold value is chosen so that at or below it, no or a negligible torque contribution from the fuel injection is given.

7. The method according to claim 1, further comprising adjusting the throttle valve position based on whether a clutch for a gearbox of the vehicle is engaged.

8. The method according to claim 1, further comprising adjusting the throttle valve position based on the exhaust manifold temperature.

9. An automotive control system, comprising:
a transmission coupled to the diesel engine, the transmission having a clutch:
a diesel engine, comprising:
at least one cylinder;
a throttle valve for controlling the flow of air into the engine;
a fuel injector for each cylinder; and
an engine controller, during a motor brake condition adjusting said throttle valve to a not fully open position if an amount of fuel injected into the at least one cylinder is equal to or less than a fuel injection threshold value and based on whether the clutch is engaged.

10. The diesel engine according to claim 9, wherein the not fully open position of the throttle valve is a position in which the throttle valve is less than fifty percent open.

11. The diesel engine according claim 9, wherein the not fully open position of the throttle valve is a position in which the throttle valve is less than twenty percent open.

12. The diesel engine according to claim 11, wherein the engine controller is arranged so that the throttle valve is adjusted at least partly based on the engine speed.

13. The diesel engine according to claim 12, wherein the engine controller is arranged so that the throttle valve is adjusted at least partly based on a position of an exhaust gas recirculation valve of the engine.

14. The diesel engine according to claim 13, wherein the fuel injection threshold value is chosen so that at or below it, no or a negligible torque contribution from the fuel injection is given.

15. The diesel engine according to claim 14, wherein the transmission is a gearbox, and wherein the engine controller is adapted to adjust the throttle valve based on whether the clutch for the gearbox of the vehicle is engaged.

16. The diesel engine according to claim 15, wherein the engine controller is adapted adjust the throttle valve based on whether the engine speed is above a predetermined engine speed value.

17. The diesel engine according to claim 16, wherein the engine controller is adapted to adjust the throttle valve based on the temperature of an exhaust manifold of the engine.

18. The diesel engine according to claim 17, wherein the engine controller is adapted to determine whether the temperature of an exhaust manifold of the engine is above a predetermined manifold temperature value, and to adjust the throttle valve based on said determination.

19. The diesel engine according to claim 14, wherein the transmission is an automatic transmission, and wherein the engine controller is adapted to adjust the throttle valve based on whether the clutch of the vehicle is engaged.

20. A method for controlling a diesel engine having an exhaust manifold in a vehicle, the engine having at least one cylinder, a fuel injector for each cylinder, and a throttle valve for controlling the flow of air into the engine, the method comprising:

When exhaust manifold temperature is above a predetermined temperature, adjusting the throttle valve to assume a not fully open position to decrease a flow of relatively cold air through the engine, and through the exhaust manifold, if an amount of fuel injected into the engine cylinder is equal to or less than a fuel injection threshold value; and Avoiding such adjustment immediately after a cold start.

* * * * *